Oct. 10, 1961

R. A. MILLER 3,003,340

FLEXIBLE COUPLING

Filed Oct. 26, 1960

2 Sheets-Sheet 1

INVENTOR
ROBERT A. MILLER

BY *Rommel, Allison & Rommel*
ATTORNEYS

Oct. 10, 1961  R. A. MILLER  3,003,340
FLEXIBLE COUPLING
Filed Oct. 26, 1960  2 Sheets-Sheet 2

INVENTOR
ROBERT A. MILLER
BY
ATTORNEYS

United States Patent Office 3,003,340
Patented Oct. 10, 1961

3,003,340
FLEXIBLE COUPLING
Robert A. Miller, Rutherford, N.J., assignor to Sier-Bath Gear and Pump Co., Inc., North Bergen, N.J., a corporation of New Jersey
Filed Oct. 26, 1960, Ser. No. 65,238
9 Claims. (Cl. 64—24)

This invention relates to improvements in flexible couplings.

The coupling of this invention has primarily been provided for the interconnecting of shaft ends wherein precise timing between the ends of a drive and driven shaft is required. An example of such use is as a shaft coupling for a fuel injection pump system for the opening and closing of the ports in the fuel pump.

In installations of this type critical timing must be accomplished between the cylinders of the engine and the opening and closing of the ports in the pump and therefore provision must be made in the coupling for infinitely fine adjustments as to timing. The primary object of this invention is thus the provision of a coupling construction wherein the coupling may be secured to a pair of shaft ends and thereafter accurately adjusted in order to properly provide the desired timing relationship between the interconnected shafts.

A further object is the provision of a coupling having a minimum of working parts and constructed so that timing between the shaft ends of a pair of shafts may be accomplished with infinite accuracy, the coupling construction itself being able to withstand adverse conditions such as exposure to extreme heat and dirt, such as might be encountered adjacent to and as a part of an engine.

A further object is the provision of a novel form of universal seal between the coupling parts that prevents the accumulation of unwanted elements within the body of the coupling.

A further object is the provision of timing means between the hub and housing of the coupling in order to maintain relative positioning of this hub and housing when the coupling is disconnected, insuring replacement and relocation of the hub with respect to the housing in a certain position.

Figure 1:
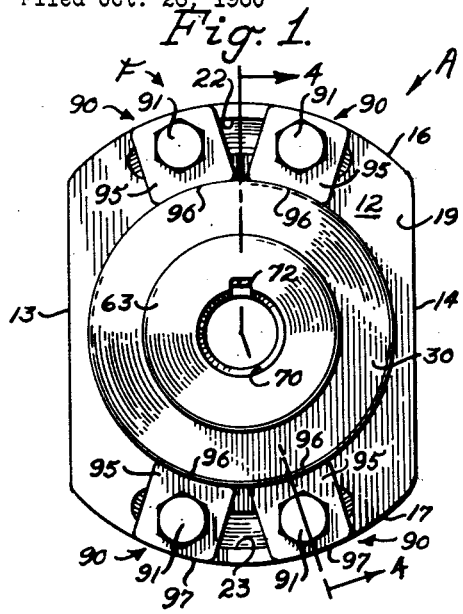
Figure 2:
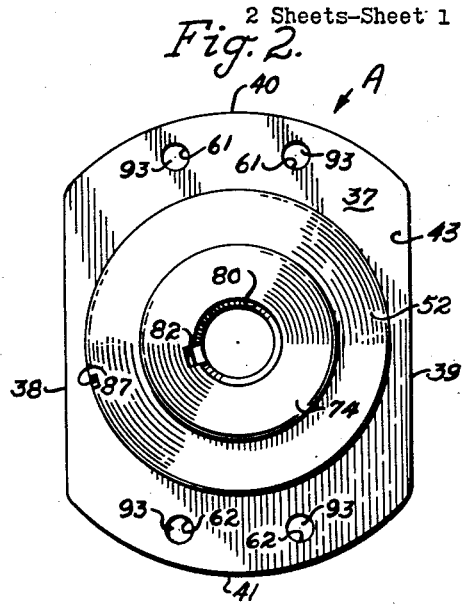
Figure 3:
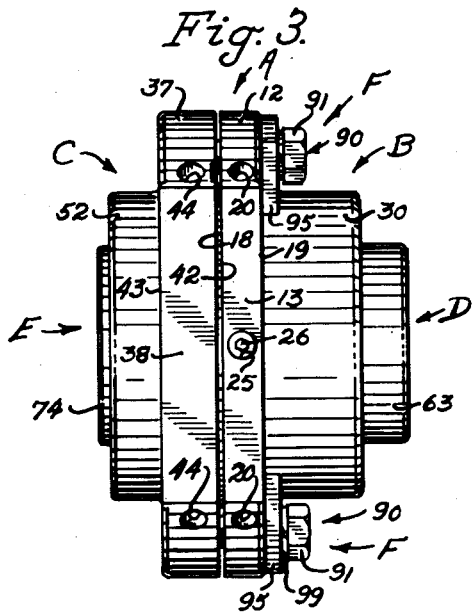
Figure 4:
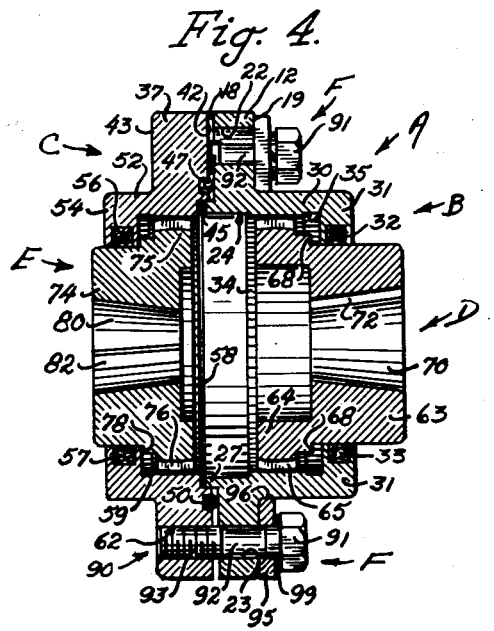
Figure 5:
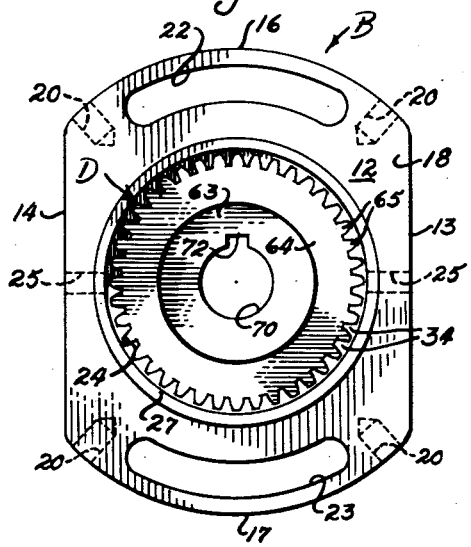
Figure 6:
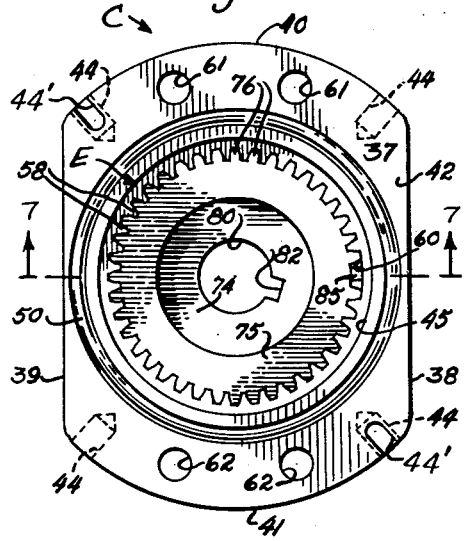
Figure 7:
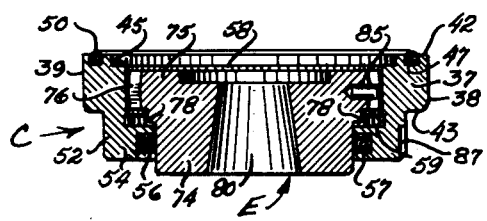
Figure 8:
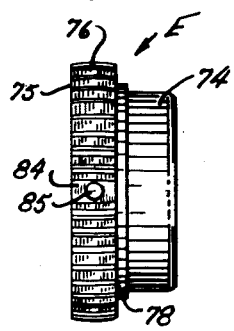
Figure 9:
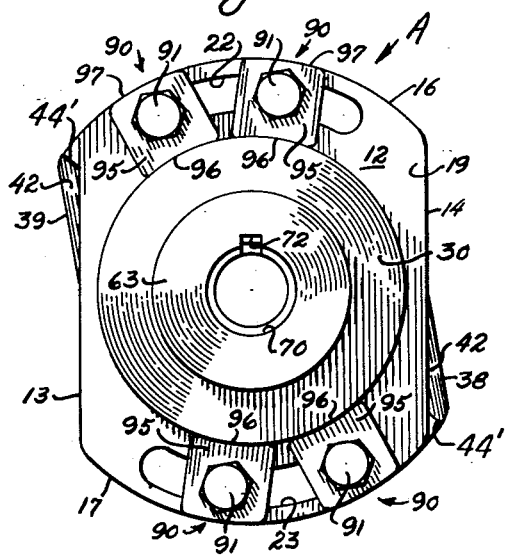

Other objects and advantages of this invention will be apparent during the course of the following detailed description, taken in connection with the accompanying drawings, forming a portion of this specification, and in which drawings:

FIG. 1 is a top plan view of the coupling.
FIG. 2 is a bottom view of the coupling.
FIG. 3 is a side elevation of the coupling.
FIG. 4 is a vertical sectional view taken substantially on the line 4—4 of FIG. 1.
FIG. 5 is an internal plan view of one-half of the coupling housing.
FIG. 6 is an internal plan view of the other half of the coupling housing.
FIG. 7 is a horizontal sectional view taken substantially on the line 7—7 of FIG. 6.
FIG. 8 is a side plan view of one of the hubs of the coupling.
FIG. 9 is a top plan view of the coupling showing it in a rotated position that may be assumed for timing purposes.

In the drawings, wherein for the purpose of illustration is shown a preferred embodiment of the invention, and wherein similar reference characters designate corresponding parts throughout the several views, the letter A may generally designate my improved coupling; B one section of the coupling housing; C another section of the coupling housing; D and E two similar complementary steel shaft hub members; and F coupling assembly means.

In assembled condition, as shown in FIGS. 1–4 and 9, the steel shaft hub members D and E are assembled in their respective housings B and C, and the same unitarily maintained in an operative relationship by means of the connecting means F.

The housing B preferably includes a main body portion 12 having flattened side portions 13 and 14, arcuate end portions 16 and 17, an internal face 18, and an external face 19. Slots 20 may be provided peripherally about the ends 16 and 17 for receiving a tool to enable the housing B to be rotated with respect to the housing C, as will be subsequently described.

The body portion 12 is provided with arcuate slotted portions 22 and 23 respectively adjacent ends 16 and 17, that cooperate with the fastening means F in the unitary assembly of the coupling.

The body portion 12 is provided with an internal chamber 24 which receives a lubricant. Openings 25, to each side 13 and 14 of the body portion 12, are provided for the injection of lubricant into the chamber 24. A threaded plug 26 is inserted in each of the openings 25 to seal the lubricant within the chamber 24.

A flanged portion 27 extends outwardly from the face 18 of the body portion 12 for cooperative insertion within the housing C, as will be subsequently described.

Extending outwardly from the face 19 of the body portion 12 is a sleeve 30 having an inwardly turned outer flange portion 31. The inner periphery of the flange portion 31 is provided with a grove 32 which receives a sealing ring 33 that abuts against hub D and provides a seal for maintaining the lubricant within the chamber 24.

Internal gear teeth 34 are provided about the internal periphery of sleeve 30 for cooperative engagement with hub D, as will be subsequently described.

The chamber 24 is provided to one side of the teeth 34 and a grooved portion 35 is provided interiorly of the sleeve 30, to the other side of the chamber 24, the chamber 24 and grooved portion 35 defining spaces to either side of the teeth 34 so that the coupling may accommodate angular misalignment and end float of the hub portion D with respect thereto.

The housing C preferably includes a main body portion 37 having flattened side portions 38 and 39, arcuate end portions 40 and 41, an internal face 42, and an external face 43. Slots 44 may be provided peripherally about the ends 40 and 41 and grooves 44' provided on the face 42 for receiving a tool to enable the housing B to be rotated with respect to the housing C, as will be subsequently described.

The face 42 of the body portion 37 is provided with a channel 45 within which is received the flange 27 of the housing portion B, in a telescopic relationship, providing a slidable joint that serves as aligning means for proper disposition of the housing B with respect to the housing C. The face 42 of the body portion 37 is also provided with a groove 47 that extends entirely about the grooved portion 45, which groove 47 receives a sealing ring 50. The sealing ring 50 extends outwardly from the face 42 in juxtaposition to abut against the bearing face 18 of the body portion 12 of the housing B and provides a complete seal against the intake of dirt within the chamber 24 and the loss of lubricant therefrom.

Extending outwardly from the face 43 of the body portion 37 is a sleeve 52 having an inwardly turned flange portion 54. The inner periphery of the flange portion 54 is provided with a groove 56 which receives a sealing ring 57 that abuts against the hub E.

It will thus be seen that the sealing rings 33, 50 and 57 provide a complete seal for protecting the working engagement of the hubs D and E within their respective housing portions B and C, and serve to effectively seal a lubricant therewithin.

Internal gear teeth 59 are provided about the internal periphery of sleeve 52 for cooperative engagement with hub E, as will be subsequently described.

A groove 59 is provided within the sleeve 52, extending adjacent one side of the teeth 58, and the opposite ends of the teeth 58 terminate adjacent the chamber 24 of the body portion 12, so that the groove 59 and the chamber 24 provide for movement of the hub E, in the event of angular misalignment and end float of the hub E with the housing portion C.

One of the teeth 58 of the housing C is omitted, defining an elongated slot 60 that cooperatively interfits with a predetermined point on the hub E, assuring that the hub E will always be placed in a certain position within the housing C, as will be subsequently described.

The body portion 37 is provided with two pairs of threaded openings 61 and 62 for receiving fastening means F in the unitary assembly of the coupling.

The hub D comprises means for flexibly attaching a shaft end to the housing B and preferably includes a cylindrical collar 63 formed with an inner flange portion 64 having peripheral gear teeth 65. The collar 63 is provided with a shoulder 68 that is of a greater diameter than the collar 63 and of less diameter than the teeth 65. This shoulder 68 cooperates with the flange portion 31 of the housing B and provides stop means for preventing removal of the hub D from the housing portion B when the housing portions B and C are unitarily interconnected, and means for maintaining the teeth 65 in cooperative engagement with the teeth 34, as will be seen from FIG. 4.

The collar 63 is provided with an internal bore 70 having a keyway 72 formed therein, for receiving a shaft end (not shown) upon which the coupling is to be mounted. Keys (not shown) are interfitted within the cooperating keyways of the shaft ends and the keyways 72, for retaining the hub upon the shaft.

The hub member E comprises means for flexibly attaching a shaft end to the housing C and preferably includes a cylindrical collar 74 formed with an inner flange portion 75 having peripheral gear teeth 76. A shoulder 78 is provided upon the collar 74, adjacent the inner flange 75, which shoulder portion 78 is of a greater diameter than the collar portion 74 and of less diameter than the teeth 76. The shoulder 78 cooperates with the flanged portion 54 of the housing B and provides stop means for preventing removal of the hub D from the housing B when the housings B and C are unitarily assembled, and means for maintaining the teeth 76 in cooperative engagement with the teeth 58.

The collar 74 is provided with an internal bore 80 having a keyway 82. The collar 74 snugly interfits about and receives within the bore 80 the shaft end (not shown) upon which the coupling is to be mounted. Keys (not shown) are interfitted within the cooperating keyway of the shaft and the keyway 82, retaining the hub upon its shaft.

One of the teeth 76 of the hub E is omitted, providing a slotted portion 84 within which a stop 85 is mounted. This stop 85 is of such a dimension that it extends between the gear teeth adjacent thereto a distance greater than would a normal tooth, so that there is no space provided intermediate the stop 85 and either of its adjacent gear teeth for a corresponding tooth 58 of the housing C to fit therebetween. This stop 85 of the hub E is designed to interfit within the slotted portion 60 of the housing portion C, so that in any insertion of the hub E within the housing portion C the stop 85 must always interfit within the slot 60, providing a positive means of alignment of the hub E with the housing C.

A timing groove 87 is provided in the outer peripheral portion of the sleeve 52 of the housing C for alignment with a timing indicator of the shaft end received within the bore 80 of the collar 74.

The fastening means F preferably include bolt means 90, each of which have a head section 91, a shaft 92, and a threaded end section 93. The threaded end section 93 cooperatively interfits within the threaded openings 61 and 62 of the housing portion C, the shaft portion 92 being received within the arcuate slots 22 and 23 of the housing portion B. A cammed washer 95 is provided adjacent the outer face 19 of the housing B, the inner portion 96 of such washer being of an arcuate configuration and designed to abut against the collar 30 of the housing portion B, in order to eliminate any vibratory motion of the housing B with respect to the housing C that might be caused by the loose interfitting of the shaft 92 of the fastening means 90 within the slot 32. The outer portion 97 of each of the fastening means 90 may be of an arcuate configuration similar to that of the ends 16 and 17 of the housing B in order to provide a symmetrical coupling. A conventional lock washer 99 may be provided in order to securely lock the fastening means 90 in position.

In view of the fine adjustment of the coupling that is a prerequisite to a proper timing relationship, the teeth 66 and 76 of the hubs D and E are preferably crown hobbed, and the entire coupling is nitrided.

In the assembly of this coupling, the sealing rings 33, 50 and 57 are inserted within their respective grooves, the hub portion D inserted within the housing B; the hub portion E inserted within the housing C, the stop 85 being appropriately positioned within the slot 60, so that the hub E and housing C are properly aligned, the shaft ends keyed to their respective hubs; and the fastening means F inserted through the respective slots 22 and 23 and threaded within the openings 61 and 62. Prior to the time that the fastening means is tightened, the timing groove 87 of the housing C should be aligned with the timing indicator of the shaft end inserted therewithin. This is accomplished by means of inserting a prong tool in the appropriate slots 20 of the housing B and the appropriate slots 44 and grooves 44' of the housing C, and rotating the housing C with respect to the housing B, as is indicated in an exaggerated showing in FIG. 9. Of course, when initially assembling the coupling on the shaft ends, the timing groove 87 will be substantially aligned with the timing indicator of its shaft end, however, in assemblage it is impossible to secure an accurate alignment, and the degree of rotational movement permitted between the housings B and C will provide for extremely accurate alignment of the timing groove 87 with the timing indicator of the shaft end. After the timing groove 87 and the timing indicator of the shaft end have been aligned, the fastening means F will be securely tightened, thus affixing the coupling in its proper position for operation.

Various changes in the shape, size and arrangement of parts may be made to the form of invention herein shown and described, without departing from the spirit of the invention or the scope of the following claims.

I claim:

1. In a flexible coupling the combination of a first housing, means for attaching a shaft end to said first housing, a second housing, means for attaching a shaft end to said second housing, and fastening means for securing said first and second housings together in a predetermined rotative relationship to form a unitary coupling, said first and second housings including attaching means cooperatively engaging said fastening means for permitting relative rotation of said first housing with respect to said second housing when assembled in a unitary coupling relationship, said attaching means including the provision of a fixed point of attachment for said fastening means on one of said housings and the other of said housings including a slot slidably receiving said fastening means, said last mentioned housing being relatively movable with respect to said fastening means and said first mentioned housing by movement of said fastening means through said slot, said fastening means including a cammed washer mounted in abutting relationship with respect to said housing having a slot therein for maintaining such housing in axial alignment with the other housing, the tightening of said fastening means serving to fixedly secure said housings in a predetermined rotative relationship with respect to each other.

2. In a flexible coupling the combination of a first housing, said first housing including a channel portion on one face thereof, means for attaching a shaft end to said first housing, a second housing, said second housing including a flanged portion on one face thereof, said channel portion and said flange being positioned upon the respective housing for the reception of said flange slidably within said channel portion, the relationship of said channel portion and said flange being such as to permit relative rotation of said flanged portion within said channel portion and maintaining said first housing in aligned axial relationship with respect to said second housing, means for attaching a shaft end to said second housing, and fastening means for securing said first and second housings together to form a unitary coupling, said first and second housings including attaching means cooperatively engaging said fastening means for permitting relative rotation of said first housing with respect to said second housing when assembled in a unitary coupling relationship, and said fastening means including means for fixedly securing said first and second housings together in a predetermined rotative relationship.

3. A flexible shaft coupling of the self-aligning gear type including a first housing having internal gear teeth extending about the internal periphery thereof; a shaft end hub having a collar with gear teeth provided upon the external periphery thereof mounted upon said first housing, the gear teeth of said hub meshing with the gear teeth of said first housing; a second housing having gear teeth extending about the internal periphery thereof; a shaft end hub having a collar with gear teeth provided about the external periphery thereof mounted upon said second housing, with the gear teeth of said second mentioned hub meshing with the gear teeth of said second housing; the gear teeth of one of said housings being mutilated to provide a grooved portion about the internal periphery of such housing of a width greater than the width of any of the gear teeth of said shaft end hub meshing therewith, and the shaft end hub meshing with said housing having mutilated gear teeth being provided with stop means interfitting within said grooved portion of said housing, said stop means being of a width greater than the spacing between any of the gear teeth of said housing, so that said housing having mutilated gear teeth and said shaft end hub having stop means can be assembled in only a certain predetermined relationship with said stop means interfitting within said groove of said housing; and fastening means for securing said first and second housings together to form a unitary coupling, said first and second housings including attaching means cooperatively engaging said fastening means for permitting relative rotation of said one of said housings having said grooved portion and its shaft end hub having said stop means with respect to the other of said housings when assembled in unitary coupling relationship, said fastening means including means for fixedly securing said first and second housings together in a predetermined rotative relationship.

4. A flexible shaft coupling as specified in claim 3 wherein the external peripheries of each of said housings are provided with tool receiving apertures for the relative rotation of one of said housings with respect to the other of said housings.

5. A shaft coupling as specified in claim 3 wherein said second housing is provided with a timing groove for alignment with a timing indicator of the shaft received within said shaft end hub meshing therewith.

6. In a flexible coupling the combination of a first housing, said first housing including a channel portion on one face thereof and provided with a grooved portion extending peripherally about said channel portion and spaced therefrom; a sealing ring disposed within said grooved portion; means for attaching a shaft end to said first housing; a second housing, said second housing including a face having a flanged portion extending outwardly therefrom, said face of said second housing extending outwardly from said flanged portion in juxtaposition for contact with said sealing ring; means for attaching a shaft end to said second housing; said first and second housings including sealing means in cooperative abutment with their respective means for attaching a shaft end thereto for maintaining a lubricant within said housings; and fastening means for securing said first and second housings together to form a unitary coupling, with said sealing means and said sealing ring disposed in cooperative relationship for maintaining a lubricant therewithin, said first and second housings including attaching means cooperatively engaging said fastening means for permitting relative rotation of said first housing with respect to said second housing when assembled in a unitary coupling relationship, said channel portion of said first housing and said flange of said second housing being positioned upon their respective housings for the reception of said flange portion slidably within said channel portion, the relationship of said channel portion and said flange being such as to permit relative rotation of said flanged portion within said channel portion and maintaining said first housing in aligned axial relationship with respect to said second housing, and said fastening means including means for fixedly securing said first and second housings together in a predetermined rotative relationship.

7. In a flexible coupling the combination of a first housing having internal gear teeth extending about the internal periphery thereof, said first housing defining a chamber portion to one side of said gear teeth and having a grooved portion to the other side of said gear teeth, a shaft end hub having a collar with gear teeth provided upon the external periphery thereof mounted upon said first housing, the gear teeth of said hub meshing with the gear teeth of said first housing, and said housing including sealing means cooperatively engaging said hub for sealing a lubricant within said chamber of said first housing; a second housing having gear teeth extending about the internal periphery thereof, said second housing being disposed in abutting relationship with respect to said first housing so that the gear teeth of said second housing are adjacent said chamber of said first housing, and a grooved portion provided in said second housing adjacent the opposite side of said gear teeth from said chamber of said first housing; sealing means disposed intermediate said first and second housings for maintaining a lubricant within the chamber of said first housing; a shaft end hub having a collar with gear teeth provided about the external periphery thereof mounted upon said second housing, with the gear teeth of said second mentioned hub meshing with the gear teeth of said second housing, said second housing including sealing means for cooperative engagement with said second mentioned hub for sealing a lubricant within said chamber of said first housing; and fastening means for securing said first and second housing together to form a unitary coupling, said first and second housings including attaching means for cooperatively engaging said fastening means for permitting relative rotation of said first housing with respect to said second housing when assembled in a unitary coupling relationship, and said fastening means including means for fixedly securing said first and second housings together in a predetermined rotative relationship.

8. The combination as specified in claim 7 wherein said housings are each provided with a sleeve portion having an opening cooperatively extending about said collars of said first and second mentioned shaft end hubs, and wherein each of said shaft end hubs is provided with a shoulder portion intermediate the gear teeth thereof and the collar portion thereof extending in a cooperative relationship with respect to said sleeve portion, the diameter of each of said shoulder portions being greater than the internal diameter of the openings provided through said sleeves that receive said collars, said shoulder portions abutting against said sleeve portions in conditions of extreme end float and preventing disengagement of said shaft end hubs from within said first and second housings.

9. In a flexible coupling the combination of a first housing, means for attaching a shaft end to said first housing, a second housing, means for attaching a shaft end to said second housing, one of said housings and the means for attaching a shaft end to such housing having cooperatively interengaging means for assembly thereof so that such shaft end attaching means is always disposed in certain rotative relationship with respect to its housing, and fastening means for securing said first and second housings together to form a unitary coupling, said first and second housings including attaching means cooperatively engaging said fastening means for permitting relative rotation of said first housing with respect to said second housing when assembled in a unitary coupling relationship, and said fastening means including means for fixedly securing said first and second housings together in a predetermined rotative relationship.

References Cited in the file of this patent

UNITED STATES PATENTS

| | | |
|---|---|---|
| 1,177,638 | Larson et al. | Apr. 14, 1916 |
| 1,195,940 | Christensen | Aug. 22, 1916 |
| 1,480,096 | Moore | Jan. 8, 1924 |

FOREIGN PATENTS

| | | |
|---|---|---|
| 274,214 | Great Britain | July 20, 1927 |